United States Patent
Rangavajjhala et al.

(10) Patent No.: US 7,353,288 B1
(45) Date of Patent: Apr. 1, 2008

(54) SONET/SDH PAYLOAD RE-MAPPING AND CROSS-CONNECT

(75) Inventors: Venkata Rangavajjhala, Fremont, CA (US); Venkata Kalapatapu, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 687 days.

(21) Appl. No.: 09/978,927

(22) Filed: Oct. 17, 2001

(51) Int. Cl.
*G06F 15/16* (2006.01)

(52) U.S. Cl. ...................... 709/236; 370/466

(58) Field of Classification Search ............... 709/232, 709/233, 236; 370/412, 466
See application file for complete search history.

(56) References Cited

U.S. PATENT DOCUMENTS

| | | | | |
|---|---|---|---|---|
| 5,172,376 A | * | 12/1992 | Chopping et al. ........ 370/509 |
| 5,526,349 A | * | 6/1996 | Diaz et al. ................. 370/392 |
| 5,544,172 A | * | 8/1996 | Abbas ....................... 370/505 |
| 5,687,318 A | * | 11/1997 | Oksanen et al. .......... 709/234 |
| 5,857,092 A | * | 1/1999 | Nakamura et al. .......... 710/62 |
| 6,011,802 A | * | 1/2000 | Norman ..................... 370/466 |
| 6,058,119 A | * | 5/2000 | Engbersen et al. ........ 370/466 |
| 6,477,178 B1 | * | 11/2002 | Wakim et al. ............. 370/466 |
| 6,587,470 B1 | * | 7/2003 | Elliot et al. ................ 370/404 |
| 6,600,741 B1 | * | 7/2003 | Chrin et al. ............... 370/375 |
| 6,647,428 B1 | * | 11/2003 | Bannai et al. ............. 709/245 |
| 6,717,953 B1 | * | 4/2004 | Heuer et al. ............... 370/466 |
| 6,880,086 B2 | * | 4/2005 | Kidder et al. ............. 713/191 |
| 6,934,262 B1 | * | 8/2005 | Lau et al. .................. 370/256 |
| 2002/0141256 A1 | * | 10/2002 | Barri et al. ................ 365/200 |

* cited by examiner

*Primary Examiner*—Larry D. Donaghue
*Assistant Examiner*—Asghar Bilgrami
(74) *Attorney, Agent, or Firm*—Clements Bernard Miller; Christopher L. Bernard; Tyler S. Brown

(57) ABSTRACT

Multiple frames of SDH framed data are received. Each frame has an overhead portion and a payload portion. The payload portions of multiple frames are identified and extracted. These payloads are switched and re-mapped to a different STM structure as required.

18 Claims, 6 Drawing Sheets

SONET/SDH PAYLOAD RE-MAPPING AND CROSS-CONNECT

RELATED APPLICATIONS

The present application is related to co-pending U.S. patent application Ser. No. 09/981.697 entitled "TIME-SLICED AU/TU POINTER PROCESSING OF SONET/SDH FRAMES" and filed on Oct. 17, 2001.

FIELD OF THE INVENTION

The invention relates to network communications. More specifically the invention relates to AU/TU pointer processing within SONET/SDH frames.

BACKGROUND OF THE INVENTION

With the maturation of the computer and surrounding technologies, vast amounts of complex, mixed traffic types are transmitted through synchronous optical networks (SONETs). One SONET standard is described in the American National Standards Institute (ANSI) standards T1.105 and T1.106 and in the Bellcore Technical Recommendations TR-TSY-000253. While the SONET standard is popular within the North American continent, the Synchronous Digital Hierarchy (SDH) network, as defined in the ITU-T GR707 document, is prevalent in other regions of the world. The SDH global standards were derived from SONET and include most of the features specified by SONET.

The basic building block of SDH networks is the SDH ring connection. FIG. 1 illustrates a basic SDH ring connection. SDH switch 100 and SDH switch 150 receive optical signals from various devices (not shown in FIG. 1). SDH switch 100 and SDH switch 150 can be coupled to other SDH switches, or other devices that communicate data using optical signals.

SDH switch 100 and SDH switch 150 communicate using two sets of uni-directional signaling pairs. In general, half of the traffic between switches travels over one of the signaling pairs and the other half of the traffic travels over the other signaling pair. SDH switches communicate according to a predetermined protocol, and at a predetermined bit rate.

Legacy telecommunication networks are based on a 'Plesiochronous Digital Hierarchy' (PDH) of signals which are not directly compatible between communications protocols used in different regions of the world. The SDH protocol has been developed to act as a common synchronous transport mechanism to transport different kinds of legacy PDH signals. Each of these PDH signals is mapped into Virtual Containers (VCs) and multiple VCs are mapped into SDH frames before being transported. The VCs constitute the payload for the SDH transport system. In the table that follows, bit rates are set forth as bits per second (bps) and multiples thereof, for the common PDH signals. The related virtual container is also listed.

TABLE 1

| Telco PDH Hierarchy | | | |
|---|---|---|---|
| Signal | Bit Rate | Channels | Virtual Container |
| DS0 | 64 kbps | 1 DS0 | |
| DS1 | 1.544 Mbps | 24 DS0s | VC11 |
| E1 | 2.048 Mbps | 32 DS0s | VC12 |
| DS2 | 6.312 Mbps | 96 DS0s | VC2 |
| E3 | 34.368 Mbps | 16 E1s | VC3 |

TABLE 1-continued

| Telco PDH Hierarchy | | | |
|---|---|---|---|
| Signal | Bit Rate | Channels | Virtual Container |
| DS3 | 44.736 Mbps | 28 DS1s | VC3 |
| E4 | 139.264 Mbps | 4 E3s | VC4 |

Multiple VC11s, VC12s and VC2s can be mapped into a single VC3 and three VC3s can be mapped into a single VC4. Multiple VC3s (North American standard) or VC4s (Europe and Asia) can be mapped into SDH frames (known as Synchronous Transport Modules or STMs) before being converted into Optical Signals (OC) and sent through fiber. VCs that are mapped into other (higher rate) VCs are known as Tributary Units (TUs). VCs that are mapped into STMs are known as Administrative Units (AUs). The common STMs associated with SDH signals, their bit rates and their transport capacity are shown in the following table.

TABLE 2

| SDH Hierarchy | | |
|---|---|---|
| Signal | Bit Rate | Capacity |
| STM-0, OC-1 | 51.840 Mbps | 1 VC3 |
| STM-1, OC-3 | 155.520 Mbps | 1 VC4 |
| STM-4, OC-12 | 622.080 Mbps | 4 VC4s |
| STM-16S-48, OC-48 | 2488.320 Mbps | 16 VC4s |
| STM-64, OC-192 | 9953.280 Mbps | 64 VC4s |

Because of the difference in the STM structure within North American SDH networks and SDH networks in other parts of the world, it is required to re-map SDH payloads to the destination STM structure while crossing network domains. This function is usually implemented in dedicated systems (known as gateways) which extract the SDH payloads from the originating network and re-map them to the STM structure of the target network, before transmitting them.

SUMMARY OF THE INVENTION

Multiple frames of SDH framed data are received. Each frame has an overhead portion and a payload portion. The payload portions of multiple frames are identified and extracted. These payloads are switched and re-mapped to a different STM structure as required.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for and related to SDH data manipulation are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The description herein is set forth in terms of SDH hierarchies and protocols; however, the description applies equally to SONET hierarchies and protocols as well. Described herein are components of, and operations within, a switching system that performs switching and routing between interface cards coupled via a backplane. In one embodiment, cross-connect components switch SDH formatted data. Time and space switching at STM-0 granularity is accomplished by an application specific integrated circuit (ASIC) described in greater detail below. The Time and Space Switching ASIC is referred to herein as a "TISSA".

As described in greater detail below, the switching system can include various interface cards that support transmission of DS-N, Ethernet, and OC-N signals, where N is any SDH supported data rate (e.g., 1, 3, 12, 48, 192, 768). Further, the DS-N cards can be configured to receive/transmit signals in a frame relay (FR) or asynchronous transfer mode (ATM) format. The data transfer between the various communications cards and the TISSA is performed by a second ASIC, referred to as a High Speed Serial ASIC, or "HISSA".

A HISSA is a device that provides high speed data signals that can be communicated over a switching system backplane. In one embodiment, a HISSA provides communications channels that are utilized for transport of STS frames between tributary/trunk cards and a cross-connect card within the switching system.

Figure 1:
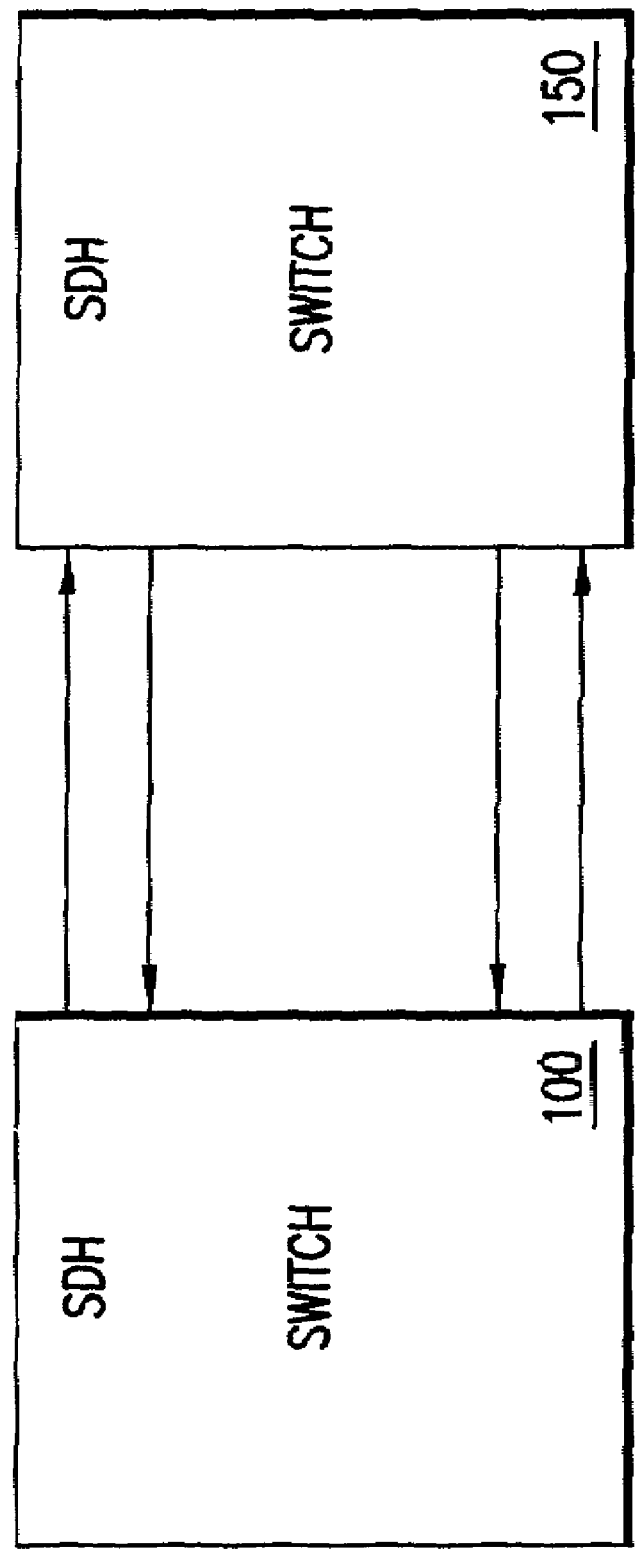
FIG. 1 illustrates a basic SDH ring connection.
Figure 2:
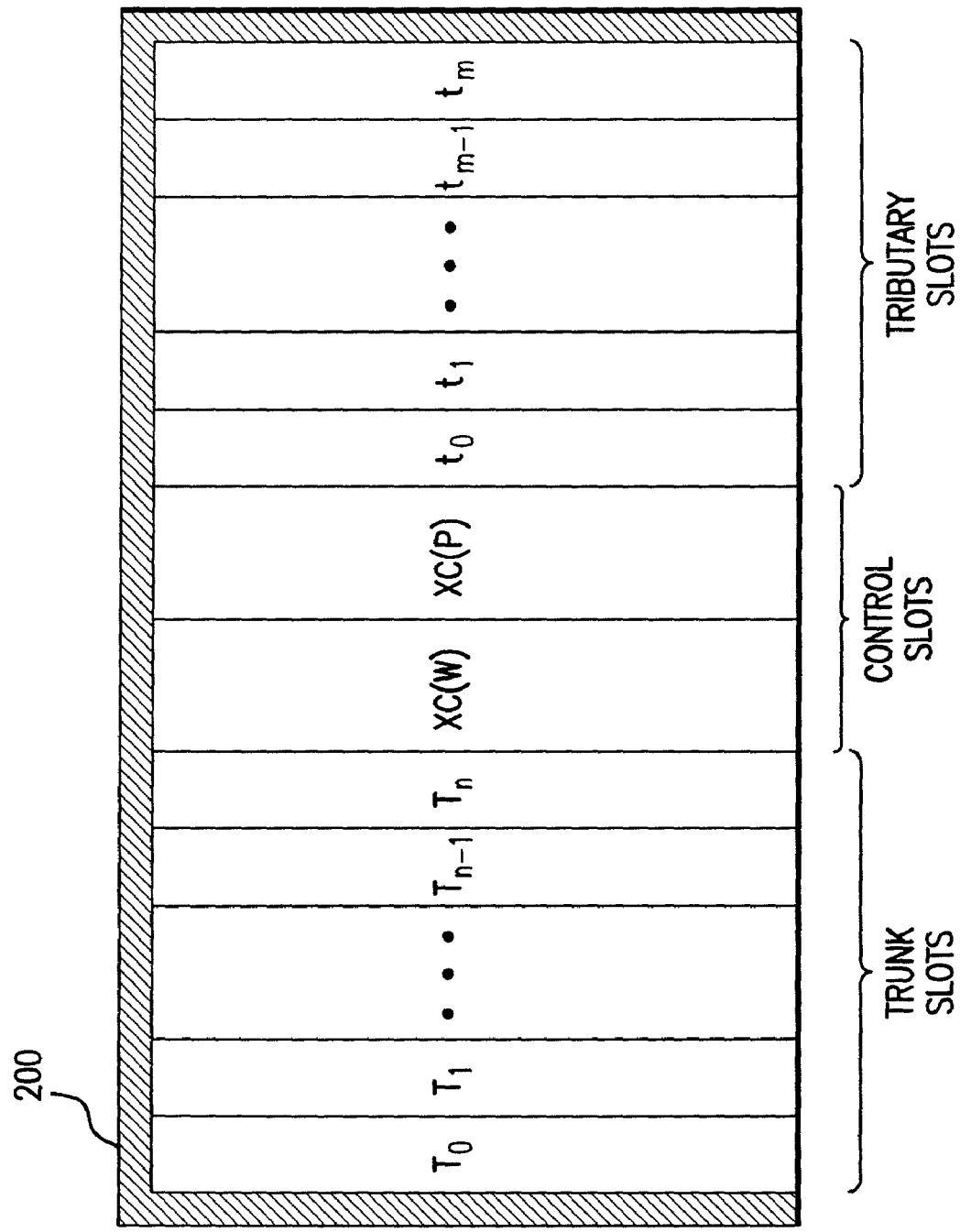
FIG. 2 illustrates a conceptual view of one embodiment of a TMO switch configuration.

FIG. 2 illustrates a conceptual view of one embodiment of a switch configuration. In one embodiment, the switch includes a backplane (not shown in FIG. 2) that interconnects multiple cards that are inserted into slots in switch body 200. In one embodiment, the switch has two cross-connect (XC) cards, one of which is active, or the working cross-connect (XC-W), and the other of which is a protection cross-connect (XC-P) that provides redundancy for the working cross-connect.

Interface cards are divided into two categories: trunk cards and tributary cards. In one embodiment, trunk cards ($T_0$ through $T_n$) are positioned on one side of the cross-connect cards and tributary cards ($t_0$ through $t_m$) are positioned on the opposite side of the cross-connect cards. In general, trunk cards are used to provide an interface to one or more other devices using high speed SDH connections (e.g., OC-192, OC-768) and tributary cards are used to provide interfaces to one or more lower speed devices (e.g., DS1, ATM, FR, DS3).

The cross-connect card allows data to be communicated between tributary cards and trunk cards. For example, multiple DS3 tributary cards can receive data from multiple sources and the data received via the tributary cards can be combined and communicated to another switch via an OC-48 connection. Alternatively, multiple Ethernet and IP cards and receive data from multiple LANs and the data can be combined and transmitted using a SDH protocol where the bandwidth of the SDH protocol is more effectively used than if the data were transmitted as described above with respect to Table 2.

Figure 3:
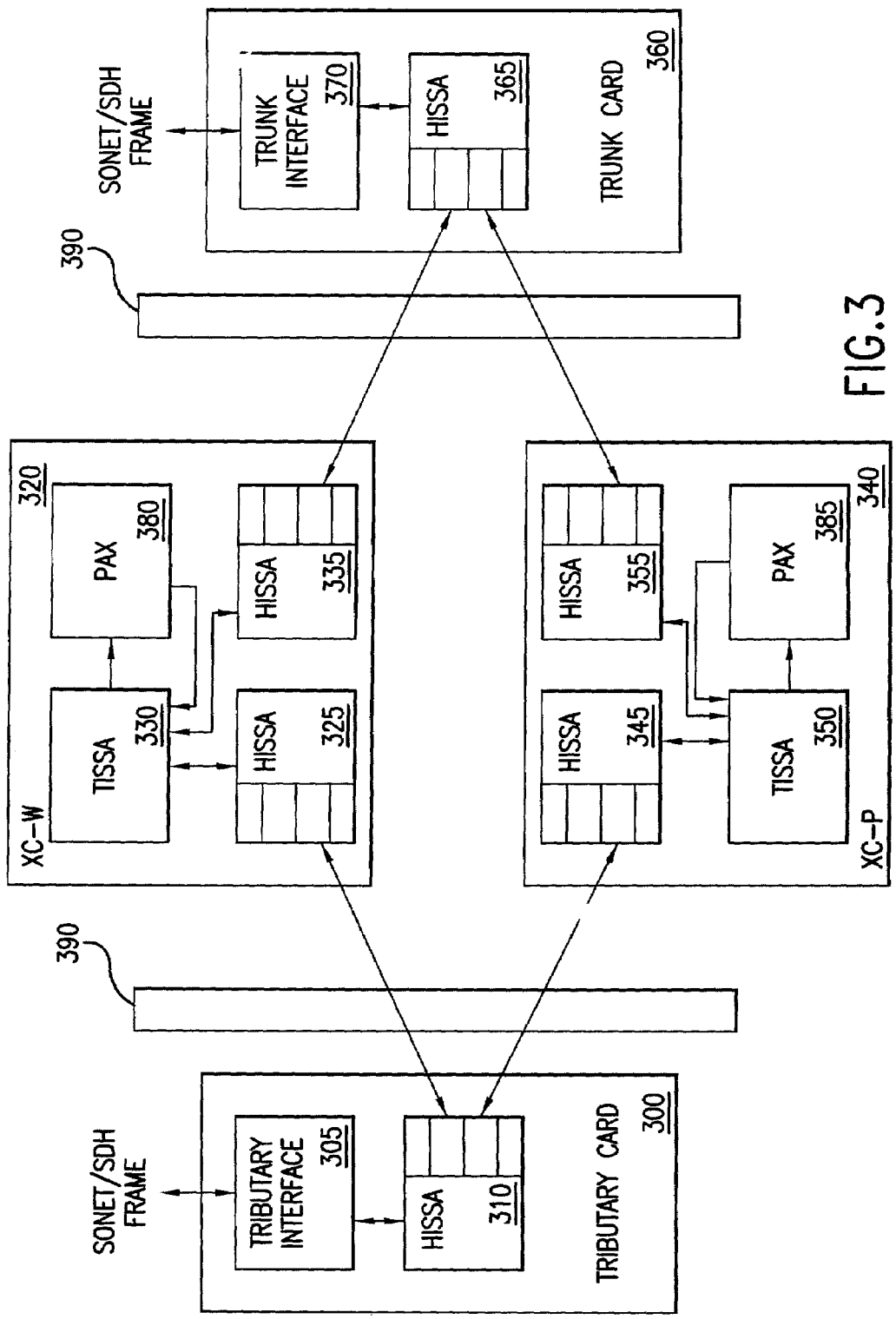
FIG. 3 illustrates one embodiment of an interconnection of a trunk card, a working cross-connect card, a protection cross-connect card and a tributary card.

FIG. 3 illustrates one embodiment of an interconnection of a trunk card, a working cross-connect card (XC-W), a protection cross-connect (XC-P) card and a tributary card. While the example of FIG. 3 describes a single trunk card coupled to a single tributary card via a working cross-connect card and a protection cross-connect card, multiple trunk cards can be interconnected with multiple tributary cards using the architectures and techniques described herein. The example of FIG. 3 describes data flow from tributary card 300 to trunk card 360; however, data flow from trunk card 360 to tributary card 300 is accomplished in the reverse manner.

The HISSAs provide the communications channels through use of a high speed serial transmission. In one embodiment, when used on a tributary card, each HISSA can accept up to four STS-1/STS-3/STS-12 or one STS-48 input and utilize four serial link cores (or groups) to provide sufficient bandwidth for transmission of a STS-48 signal over the switching system backplane.

The HISSAs on the cross-connect card convert the serial signals to parallel output signals, for example, up to four STS-1/STS-3/STS-12 or one STS-48 signal. Multiple HISSAs can be used to support signal rates greater than STS-48. For example, four HISSAs can be used to support OC-192 fiber cards.

In one embodiment, the TISSA aligns incoming frames with a Master Sync signal to eliminate skew. In one embodiment, a TISSA provides non-blocking time and space switching of SDH frames. In one embodiment, the switching configuration is stored in register arrays that are programmed by a microcontroller or in another manner.

Data is received from a tributary source (not shown in FIG. 3) by tributary interface 305 on tributary card 300. In one embodiment, tributary interface 305 provides a parallel interface to the tributary source. The data is optical data and can be received from any appropriate optical source. Tributary interface 305 can provide an interface with the source in any manner known in the art. Tributary interface 305 converts optical data to electrical data and sends the electrical data to HISSA 310.

HISSA 310 converts the parallel data received from tributary interface 305 to one or more streams of serial data. In one embodiment, HISSA 310 has four groups, or channels, that can transmit or receive serial data; however, any number of groups can be provided. In one embodiment one group from HISSA 310 is coupled to working cross-connect (XC-W) 320 and a—second group from HISSA 310 is coupled to protection cross-connect (XC-P) 340. The same data is sent to both cross-connects in the same manner.

On XC-W 320, HISSA 325 is coupled to receive serial data from HISSA 310 via backplane 390. HISSA 325 converts the serial data to parallel data and sends the data to TISSA 330. TISSA 330 receives the data from HISSA 325 and switches the data to a desired format. For example, TISSA 330 can combine three OC-1 signals from three tributary cards into a single OC-3 signal that is provided to a trunk card. Other time and space switching can be provided by TISSA 330. Time and space switching as provided by a TISSA is described in greater detail in U.S. patent application Ser. No. 09/661,498 filed Sep. 14, 2000 and entitled "METHODS AND APPARATUSES FOR TIME AND SPACE SWITCHING OF SDH FRAMED DATA," which is assigned to the corporate assignee of the present application and incorporated by reference herein.

TISSA 330 provides parallel output data in the converted format to HISSA 335, which converts the parallel data to serial data and sends the data, over the backplane 390, to HISSA 365 on trunk card 360. HISSA 365 converts the serial data to parallel data and sends the parallel data to trunk interface 370. Trunk interface 370 converts the electrical data to optical data and provides the optical signal to a trunk line/device (not shown in FIG. 3).

XC-P 340 operates in a similar manner as XC-W 320. HISSA 345 receives serial data from HISSA 310 over the backplane 390. HISSA 345 converts the serial data to parallel data and provides the parallel data to TISSA 350. TISSA 350 receives the parallel data from HISSA 345 and performs the appropriate time/space switching functions on the data to generate a parallel output signal. HISSA 355 receives the parallel output signal from TISSA 350 and converts the parallel signal to a serial signal. HISSA 355 sends the serial signal to HISSA 365 on trunk card 360 over the backplane 390.

In one embodiment, the cross-connect cards further include a Path Adaptation and Cross-Connect (PAX) ASIC that provides pointer processing and cross connect functions for either one (two-byte wide) STM-16 signal or up to four independent (one-byte wide) STM-4 signals. In alternate embodiments, other signal levels (e.g., STM-64, STM 96) can be supported.

In one embodiment, each PAX is capable of accepting any valid combination of AU-4/AU-3 structured STM frames and re-mapping the virtual containers (VCs), or payloads, within the frames to any combination of AU-4/AU-3 structured STM frames on the output. In one embodiment each PAX is capable of re-mapping VC-3 payloads from AU-3 structured frames to AU-4 structured frames and vice versa.

Re-mapping between AU-3 structured frames and AU-4 structured frames allows a PAX to operate as a SDH-SONET bridge by converting between SONET and SDH frame structure. In an alternate embodiment, the frames output by each PAX are aligned such that all the AU-3 payloads and AU-4 payloads have the same starting location. In other words, the AU-3 pointers and the AU-4 pointers point to the same location in the frame.

In one embodiment, each PAX provides for Alarm Indication Signal (AIS), PLM, Loss of Message (LOM) and Loss of Pointer (LOP) detection and can optionally generate path AIS for each AU. LOP and AIS detection and optional AIS generation capabilities are provided for each TU structured frame. Support is also provided for AIS and UNEQ insertion at both AU and TU levels.

Figure 4:
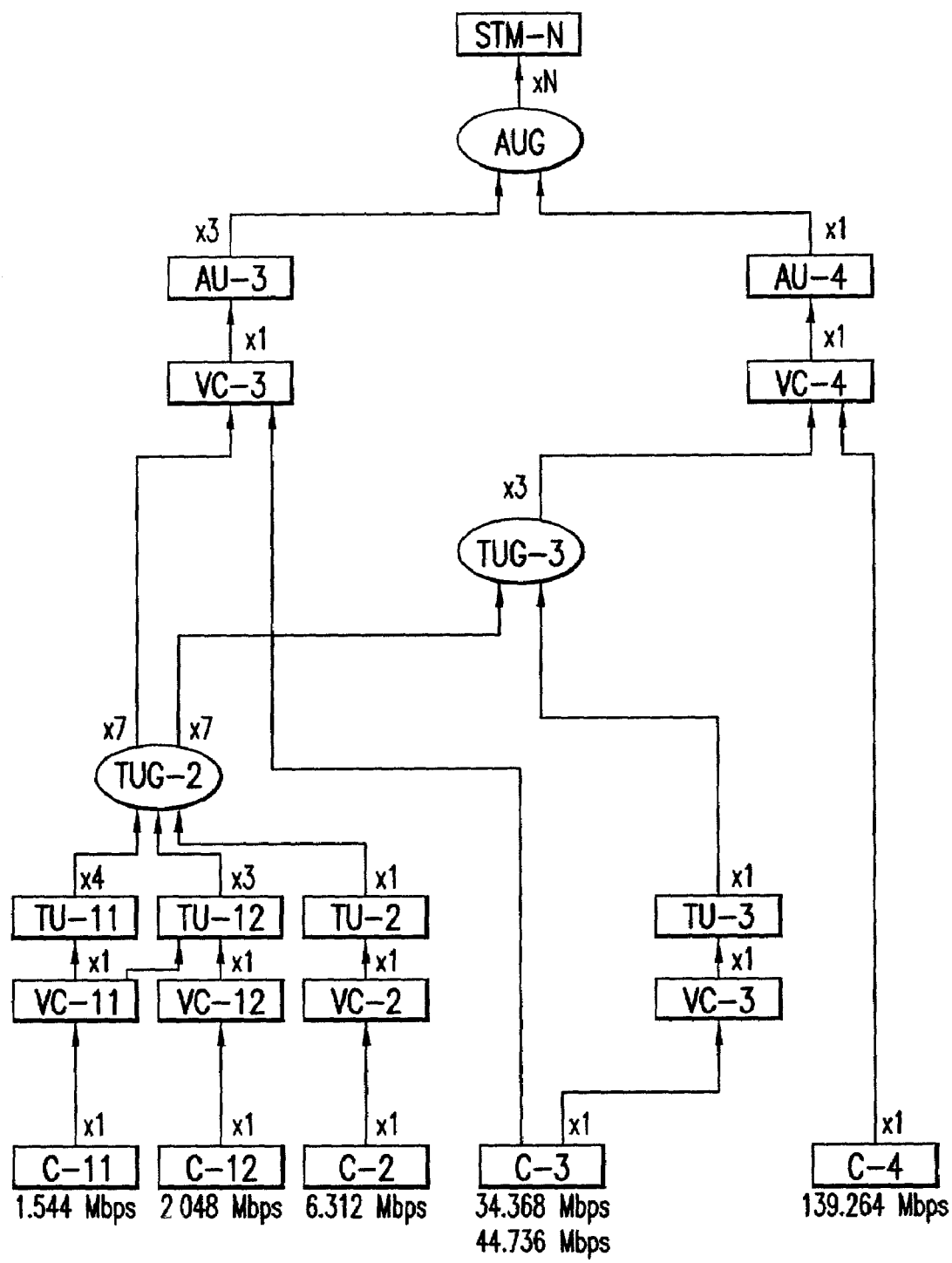
FIG. 4 is a graphical representation of STS-N signal composition.

FIG. 4 is a graphical representation of STM-N signal composition. FIG. 4 illustrates the relationship between containers (C), virtual containers (VC), tributary units (TU), tributary unit groups (TUG), administrative units (AU), administrative unit groups (AUG) and STM-N signals. The hierarchy associated with AU-3 structured frames is used in North America while the hierarchy associated with AU-4 structured frames is used in Europe. Each level of the hierarchy has an associated payload and overhead.

Containers, or container-level signals, are mapped to corresponding virtual containers with associated overhead. FIG. 4 illustrates C-11 (1.544 Mbps), C-12 (2.048 Mbps), C-2 (6.312 Mbps), C-3 (34.368 Mbps/44.736 Mbps), and C-4 (139.264 Mbps), which are common container level structured frames known in the art. Additional and/or different container level structured frames can also be supported. In one embodiment, the overhead associated with mapping container structured frames to virtual container structured frames are known a path overhead bytes.

VC structured frames are mapped, along with TU pointers to an appropriate TU structured frame (e.g., TU-11, TU-12, TU-2, TU-3). One or more TU structured frames are used to create a TUG-level signal. For example, four TU-11 structured frames are byte-interleavingly mapped to a TUG-2 structured frame. Similarly, three TU-12 structured frames are byte-interleavingly mapped to a TUG-2 structured frame. A single TU-2 structure frame is mapped to a TUG-2 structured frame and a single TU-3 structured frame is mapped to a TUG-3 structured frame.

Seven TUG-2 structured frames can be byte-interleavingly mapped to either a single TUG-3 structured frame or a single VC-3 structured frame. Three TUG-3 structured frames can be byte-interleavelingly mapped to a VC-4 structured frame. Also, a C-3 structured frame can be mapped to a VC-3 structured frame and a C-4 structured frame can be mapped to a VC-4 structured frame.

VC-3 structured frames are mapped to AU-3 structured frames with the addition of AU pointers. Similarly, VC-4 structured frames are mapped to AU-4 structured frames with the addition of AU pointers. In general, AU-3 structured frames are used in North America while AU-4 structured frames are used in Europe. AU-3 and AU-4 structured frames are mapped to STM-N structured frames, where N can be 1, 4, 16, etc.

Returning to FIG. 3, in one embodiment a PAX receives a stream of data, for example, from a TISSA and provides cross-connect functionality at STM-16 column granularity on any valid mix of AU structured frames and TU structured frames contained in an STM-16 structured frame. In one embodiment, XC-W 320 and XC-P 340 include PAX 380 and PAX 385 coupled with TISSA 330 and TISSA 350, respectively. TISSA 330 and TISSA 350 provide STS-1 level switching. PAX 380 and 385 provide TU level switching. In one embodiment, an output stream from a TISSA is input to a PAX for TU level switching. The output from the PAX is fed back to the TISSA, which further switches the signal, if necessary, before transmitting the signal to an output card.

Figure 5:
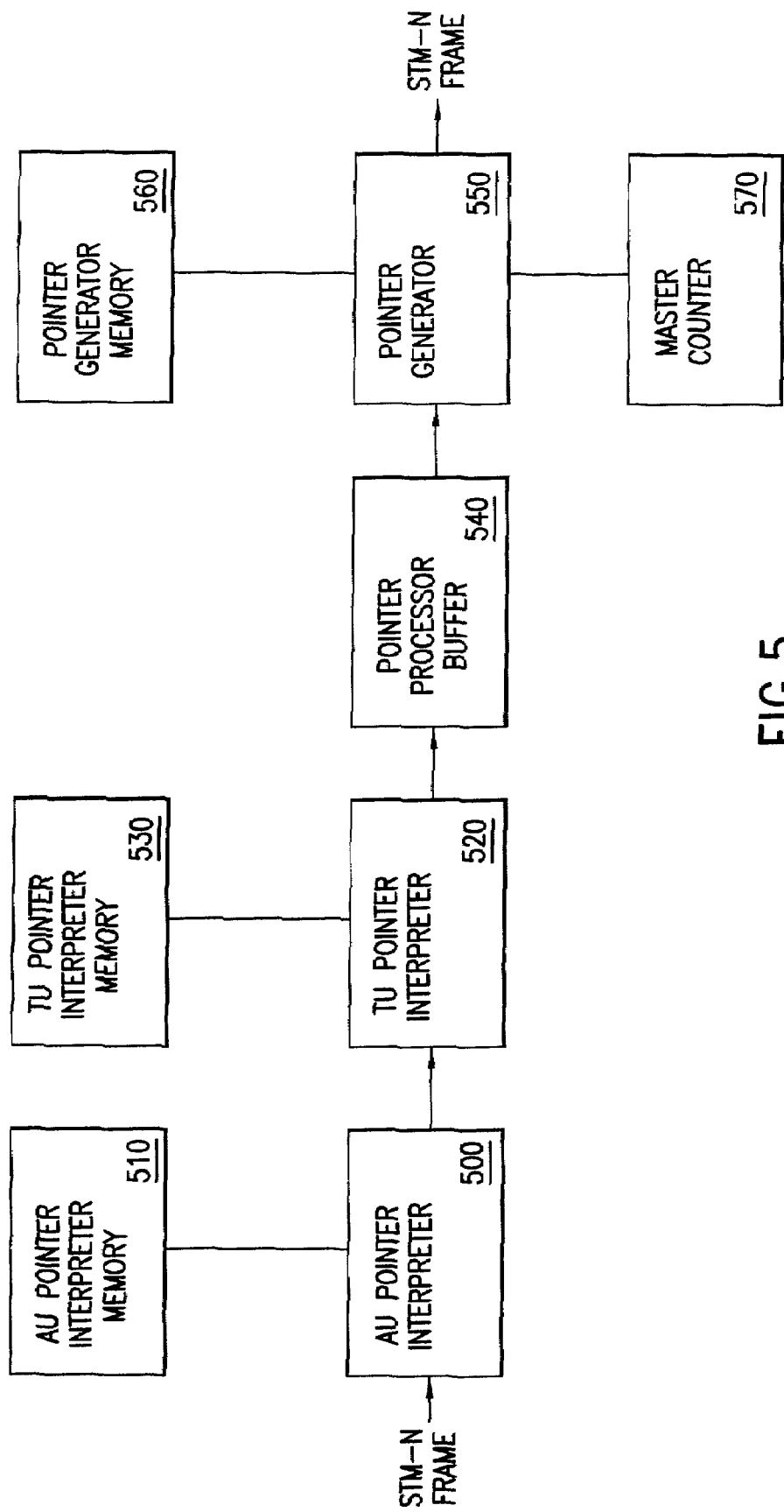
FIG. 5 is a block diagram of one embodiment of a PAX.

FIG. 5 is a block diagram of one embodiment of a PAX. In one embodiment, the PAX provides AU and TU level pointer processing in a time sliced manner. Because the individual TU structured frames of an STM-N frame are byte interleaved, the bytes of a selected TU structured frame are received at regular intervals. Thus, the PAX can process the first byte of each TU structured frame followed by the second byte of each TU structured frame and so on.

AU pointer interpreter 500 receives one or more streams of bytes that represent an STM-N frame and performs high order (HO) processing of the STS level signal. AU pointer interpreter 500 is coupled to AU pointer interpreter memory 510. AU pointer interpreter 500 uses AU pointer interpreter memory 510 to store the necessary data to process bytes for the AU level signals embodied within the STM-N frame.

AU pointer interpreter 500 interprets incoming AU pointers and extracts the high-order payloads from each STM-N frame. In one embodiment, AU pointer interpreter 500 is a time sliced state machine that processes multiple AU-3/AU-4 frames. State information for the frames (e.g., H1/H2 bytes, accepted H1/H2, row/col. counts associated with the HO VCs, path overhead byte value) is stored as a single word in AU pointer interpreter memory 510. The word is accessed, modified and written back in a time-sliced basis based on the byte interleaving pattern of the incoming AU frames. In one embodiment, AU pointer interpreter 500 also generates the necessary control signals for TU pointer interpreter 520.

SDH framed data represents payloads from multiple virtual containers (i.e., payload and associated overhead) in an interleaved fashion. In other words, a first portion of a first virtual container is followed by a first portion of a second virtual container and so on until the first portion of each of the multiple virtual containers is transmitted. The second portions of the virtual containers are transmitted in a similar manner. Because the sizes of the virtual containers and the number of virtual containers is known, the time period between portions of a virtual container are known, which allows AU pointer interpreter 500 to process the SDH framed data in a time sliced manner.

AU pointer interpreter 500 analyses a first block of data (e.g., two bytes) in a stream of data representing SDH framed data. AU pointer interpreter 500 determines whether the block of data corresponds to overhead information or payload information. State information related to overhead is stored in AU pointer interpreter 510. Payload information and TU-level pointer information are passed to TU pointer interpreter 520. AU pointer interpreter 500. First blocks of subsequent virtual containers are processed in a similar time-sliced manner.

TU pointer interpreter 520 receives the output of AU pointer interpreter 500 and performs low order (LO) processing of the VT level signals. TU pointer interpreter 520 is coupled to TU pointer interpreter memory 530. TU pointer interpreter 520 uses TU interpreter memory 530 to process bytes from the VT level structured frames received from AU pointer interpreter 500.

In one embodiment, TU pointer interpreter 520 is a time-sliced state machine that processes multiple TU pointers and extracts lower order payloads from the TU frames. TU pointer interpreter 520 receives control signals, including TU overhead byte locations, etc., from AU pointer interpreter 500. In one embodiment, state information relating to individual TU structured frames is stored as a single word in TU pointer interpreter memory 530. The words stored in memory are accessed, modified and written back in a time sliced basis based on the byte interleaving pattern of the incoming TU structured frame.

Extracted payloads (i.e., higher order VC structured frames for non-TUG structured AU frames and lower order VC structured frames for TUG structured AU frames) are written to queues in pointer processor buffer 540. In one embodiment, pointer processor buffer 540 is partitioned logically to provide the necessary queue depth for each VC structured frame based on the configuration of the incoming frame. In one embodiment, the queue depth chosen for each VC structured frame is optimized for the type of VC structured frame received. In one embodiment, 16 bytes for VC-11, 32 bytes for VC-2, etc.

Tag bits are passed through the queue along with the data to indicate J1/V5 locations and SSF indications resulting from the pointer interpreters. These tag bits serve as the communication channel between AU pointer interpreter 500 and TU pointer interpreter 520 and pointer generator 550. The time-sliced nature of the pointer processor enables a single memory to serve as the pointer processing buffer for all AUs and TUs.

Master counter 570 is coupled to pointer generator 550 and provides timing information for pointer generator 550. A configurable master count offset register provides flexibility to adjust the phase of the outgoing frame with respect to the master sync signal, if used.

Pointer generator 550 generates pointer values to be associated with the data stored in pointer processor buffer 540 to provide the proper alignment. In one embodiment, pointer generator 550 is a time sliced state machine. Pointer generator 550 extracts the VC payloads from pointer processor buffer 540 and, based on timing information received from master counter 570 and the tag bits accompanying the data, generates the pointer values for all outgoing TU structured frames and AU structured frames. In the case of TUG structured AU frames, the high order pointers are assigned a predetermined value (e.g., 522) and all the TU pointer values are adjusted accordingly. In the case of non-TUG structured AU frames, the high order pointers are generated according to the phase dictated by master counter 570.

Pointer generator state memory 560 is also coupled to pointer generator 550. Pointer generator 550 uses pointer generator state memory to temporarily store state information as frames are assembled.

The architecture of FIG. 5 provides a set of devices that operate in a time-sliced manner as compared to the parallel architecture of FIG. 2 described above. The time-sliced architecture provides several advantages as compared to the parallel architecture. For example, a single memory is used for each of the AU pointer interpreter, the TU pointer interpreter and the pointer generator rather than a set of flip-flops or registers for each of the parallel AU pointer interpreters, TU pointer interpreters and pointer generators. The use of a smaller number of memory devices allows the resulting integrated circuit area to be smaller than a corresponding parallel architecture circuit. Another advantage of the time-sliced architecture is that a single pointer processor buffer memory is used.

Figure 6:
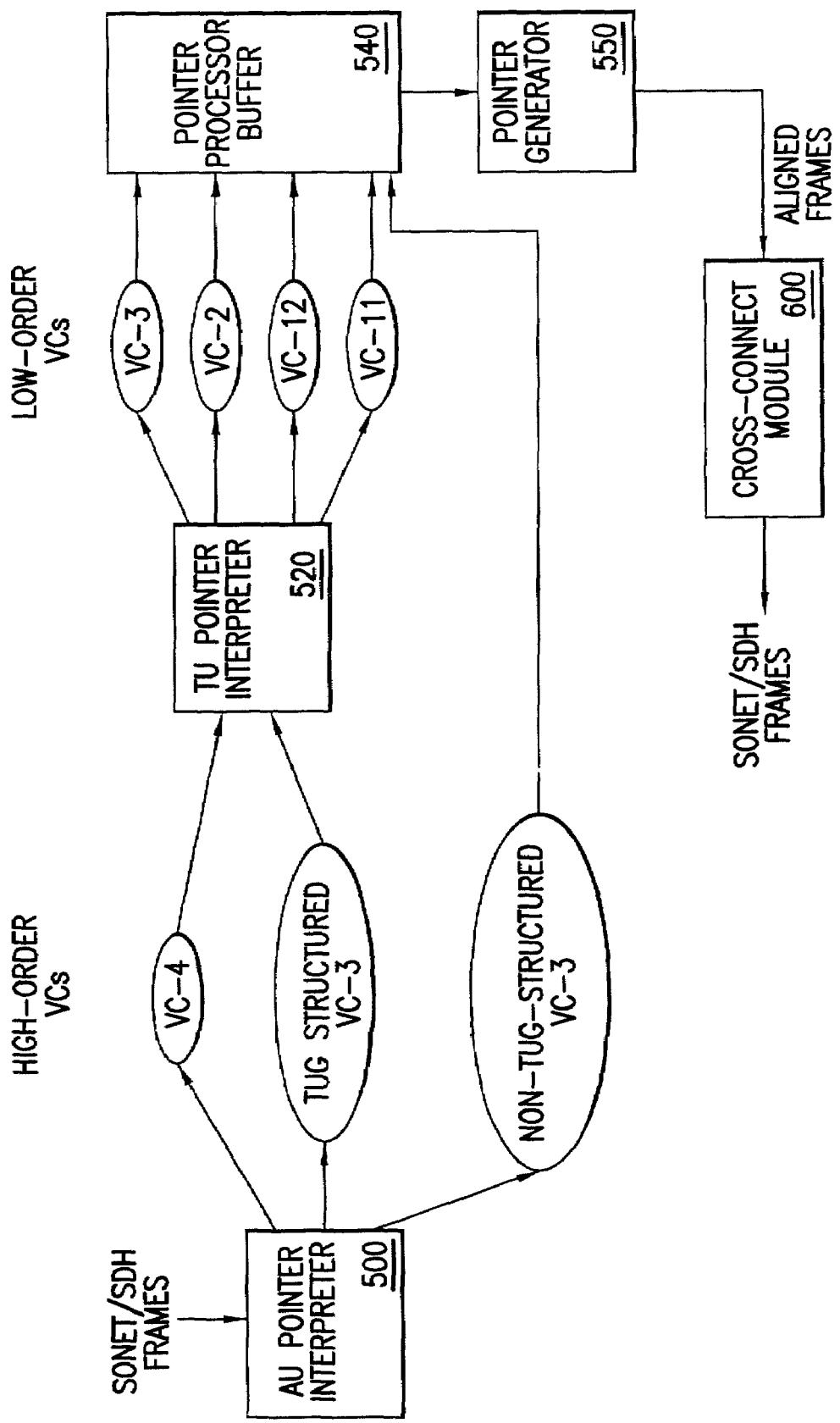
FIG. 6 is a conceptual illustration of one embodiment of AU-3/AU-4 payload remapping.

In order to implement a SDH switch that can switch at sub-STM-1 (Tributary level) granularity, all the TUs contained within the STM are aligned prior to switching. To accomplish this TU alignment, the individual payloads (VCs) are extracted and re-mapped to a common timing reference. FIG. 6 is a block diagram of a AU/TU pointer processing architecture, that accomplishes this function. Specifically, by carefully architecting the sub-STM-1 level SDH switch, such that its input and output interfaces are de-coupled, it is possible to accomplish a gateway function within the SDH switch that provides for the switching between SONET and SDH framed signals.

FIG. 6 is a conceptual illustration of one embodiment of AU-3/AU-4 payload remapping. The PAX architecture described above allows extraction of payloads (both high-order and low-order) from any valid mix of AU-3/AU-4 structured frames and remapping of the payloads to any valid mix of AU-3/AU-4 structured frames. One use for this remapping is for use, for example, in a SDH-SONET bridge.

As described above, AU pointer interpreter 500 and TU pointer interpreter 520 extract high-order and low-order payloads, respectively. In one embodiment, AU pointer interpreter 500 extracts VC-4, TUG-structured VC-3, and non-TUG-structured VC-3 payloads from incoming SDH/SONET frames. The VC-4 and TUG-structured VC-3 payloads are further processed by TU pointer interpreter 520. For non-TUG-structured VC-3 payloads, the payloads are sent directly to pointer processor buffer 540 and non-standard AU-3/AU-4 frames are generated.

TU pointer processor 520 receives TUG-structured VC-4 and/or VC-3 frames from AU pointer interpreter 500. TU pointer processor 520 extracts low-order payloads in VC-3, VC-2, VC-12, or VC-11 format. The low-order payloads are sent to pointer processor buffer 540. Thus, pointer processor buffer 540 stores both high order and low order payloads that have been extracted from the various AU and TU frame structures.

Pointer generator 550 generates aligned frames from the payloads stored in pointer processor buffer 540. In one embodiment, each of the AU-level pointers is assigned a predetermined value. Because the AU-level pointers have the same value the TU-level pointers are aligned with the AU-level overhead. Because pointer generator 550 generates pointers to be used with payloads stored in pointer processor buffer 540, the pointers can be aligned in any manner desired by selecting the offsets between pointers and payloads.

Cross-connect module 600 receives the aligned frames from pointer generator 550. Cross-connect module 600 provides synchronized cross-connect functionality at a STM-16 column granularity. Thus, cross-connect module 600 provides remapping of any valid combination of AU-4 and AU-3 frames.

FIG. 6 also illustrates one embodiment of the payload re-mapping within the architecture specified in FIG. 5. In particular, for one embodiment, multiple STM frames of STM framed data are received by AU Pointer Interpreter 500. Each STM frame is either AU3 structured (SONET compliant) or AU4 structured. Further, each STM frame contains either a single higher order payload or multiple lower order payloads. The higher order payloads are identified and extracted by AU Pointer Interpreter 500. The low order payloads are identified and extracted by TU Pointer Interpreter 520. The payloads are then switched and re-mapped to STM frames by Pointer Generator 550. The structure of the outgoing STM frames are determined by Pointer Generator 550, thus providing for the switching of STM frame formats between the input of AU Pointer Interpreter 500 and the output of Cross-Connect Module 600.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus to remap SONET/SDH payloads from a received STS/STM frame structure to a destination STS/STM frame structure, comprising:
   a plurality of cards coupled via a backplane, the plurality of cards comprising:
      a plurality of cross-connect cards, wherein the plurality of cross-connect cards comprise at least one working card and at least one protection card;
      a plurality of trunk interface cards, wherein the trunk interface cards provide an interface to one or more other devices using higher speed connections; and
      a plurality of tributary interface cards coupled to the plurality of trunk interface cards via the plurality of cross-connect cards, wherein the tributary interface cards provide an interface to one or more other lower speed devices;
   a buffer memory coupled to receive a payload portion of the received SONET/SDH framed data;
   a pointer generator coupled to the buffer memory, the pointer generator to operate in a time-sliced manner to generate the destination STS/STM frame structure with aligned, remapped payload; and
   a pointer interpreter coupled to the buffer memory that operates in a time sliced manner to identify overhead portions of the SONET/SDH framed data and a payload portion of the SONET/SDH framed data, the pointer interpreter comprising:
      a first level pointer interpreter that operates in a time sliced manner;
      a first memory coupled to the first level pointer interpreter the first memory to store data for the first level pointer interpreter:
      a second level pointer interpreter coupled to the first level pointer interpreter, the second level pointer interpreter to operate in a time sliced manner; and
      a second memory coupled to the second level pointer interpreter, the second memory to store data for the second level pointer interpreter;
   wherein the buffer memory and pointer generator are located within the plurality of cross-connect cards;
   wherein the first level pointer interpreter is configured to extract VC-4, TUG-structured VC-3, and non-TUG structured VC-3 payloads; and
   wherein the second level pointer interpreter is configured to process VC-4 and TUG-structured VC-3 payloads from the first level pointer interpreter and to extract low-order payloads in a format of VC-3 VC-2 VC-12, VC-11, and combinations thereof.

2. The apparatus of claim 1 wherein the first level pointer interpreter writes, as a single word, to the first memory state information corresponding to a particular time slice.

3. The apparatus of claim 1 wherein the second level pointer interpreter writes, as a single word, to the second memory state information corresponding to a particular time slice.

4. The apparatus of claim 1 wherein the first level pointer interpreter operates on AU-level overhead of the SONET/SDH framed data.

5. The apparatus of claim 1 wherein the second level pointer interpreter operates on TU-level overhead of the SONET/SDH framed data.

6. A method, comprising:
   providing a plurality of cards coupled via a backplane, the plurality of cards comprising:
      a plurality of cross-connect cards, wherein the plurality of cross-connect cards comprise at least one working card and at least one protection card;
      a plurality of trunk interface cards, wherein the trunk interface cards provide an interface to one or more other devices using high speed connections; and
      a plurality of tributary interface cards coupled to the plurality of trunk interface cards via the plurality of cross-connect cards, wherein the tributary interface cards provide an interface to one or more other lower speed devices;
   receiving multiple STS/STM frames of SONET/SDH data, each frame having an overhead portion and a payload portion;
   identifying a portion of a first level overhead associated with the SONET/SDH framed data;
   storing state information related to the first level overhead;
   identifying a portion of a second level overhead associated with the SONET/SDH framed data;
   storing state information related to the second level overhead;
   identifying the payload portion of the multiple frames;
   generating a plurality of aligned pointers in a time sliced manner, the pointers for use as overhead for the payload portions of the multiple frames when the payload portions are transmitted to an external destination, wherein generating a plurality of aligned pointers comprises a first level pointer interpreter configured to extract VC-4, TUG-structured VC-3, and non-TUG structured VC-3 payloads, and a second level pointer interpreter configured to process VC-4 and TUG-structured VC-3 payloads from the first level pointer interpreter and to extract low-order payloads in a format of VC-3, VC-2, VC-12, VC-11, and combinations thereof; and remapping the payload portions from a first frame structure of the received STS/STM frames to a second frame structure based on the generated pointers;

wherein the identifying the overhead, identifying the payload, generating, and remapping steps are performed by the plurality of cross-connect cards.

7. The method of claim 6 wherein storing state information related to the first level overhead comprises writing, as a single word, state information corresponding to a particular time slice.

8. The method of claim 6 wherein storing state information related to the second level overhead comprises writing, as a single word, state information corresponding to a particular time slice.

9. The method of claim 6 wherein the first level overhead comprises AU-level overhead of the SONET/SDH framed data.

10. The method of claim 6 wherein the second level overhead comprises TU-level overhead of the SONET/SDH framed data.

11. A network switching component, comprising:
a plurality of cards coupled via a backplane, the plurality of cards comprising:
  a plurality of cross-connect cards, wherein the plurality of cross-connect cards comprise at least one working card and at least one protection card;
  a plurality of trunk interface cards, wherein the trunk interface cards provide an interface to one or more other devices using high speed connections; and
  a plurality of tributary interface cards coupled to the plurality of trunk interface cards via the plurality of cross-connect cards, wherein the tributary interface cards provide an interface to one or more other lower speed devices;
an input network interface coupled to receive SONET/SDH framed data having a received STS/STM frame structure from an external source;
a pointer interpreter coupled to the input network interface, the pointer interpreter to identify overhead and payload portions of the received SONET/SDH framed data, the pointer interpreter comprising:
  a first level pointer interpreter that operates in a time sliced manner;
  a first memory coupled to the first level pointer interpreter, the first memory to store data for the first level pointer interpreter;
  a second level pointer interpreter coupled to the first level pointer interpreter, the second level pointer interpreter to operate in a time sliced manner; and
  a second memory coupled to the second level pointer interpreter, the second memory to store data for the second level pointer interpreter;
a memory coupled to the pointer interpreter, the memory to store the payload portion of the received SONET/SDH framed data;
a pointer generator coupled to the memory, the pointer generator to generate a plurality of aligned pointers for use as an overhead portion of a remapped SONET/SDH framed data having a destination STS/STM frame structure; and
an output network interface coupled to the pointer generator, the output network interface to output the remapped SONET/SDH framed data;
wherein the memory, pointer interpreter, and pointer generator are located within the plurality of cross-connect cards;
wherein the first level pointer interpreter is configured to extract VC-4, TUG-structured VC-3, and non-TUG structured VC-3 payloads; and
wherein the second level pointer interpreter is configured to process VC-4 and TUG-structured VC-3 payloads from the first level pointer interpreter and to extract low-order payloads in a format of VC-3, VC-2, VC-12, VC-11, and combinations thereof.

12. The network switching component of claim 11 wherein the first level pointer interpreter writes, as a single word, to the first memory state information corresponding to a particular time slice.

13. The network switching component of claim 11 wherein the second level pointer interpreter writes, as a single word, to the second memory state information corresponding to a particular time slice.

14. The network switching component of claim 11 wherein the first level pointer interpreter operates on AU-level overhead of the SONET/SDH framed data.

15. The network switching component of claim 11 wherein the second level pointer interpreter operates on TU-level overhead of the SONET/SDH framed data.

16. The apparatus of claim 1 wherein the pointer generator remaps the received payload portions from a received STS frame structure to a destination STM frame structure or from a received STM frame structure to a destination STS frame structure, such that the apparatus operates as a SONET-SDH bridge.

17. The method of claim 6 wherein the remapping step remaps the payload portions from a first STS frame structure to a second STM frame structure or from a first STM frame structure to a second STS frame structure such that the method bridges between SDH and SONET.

18. The network switching component to of claim 11 wherein the pointer generator generates the plurality of aligned pointers to remap the received frame structure from an STS frame structure to an STM frame structure or from an STM frame structure to an STS frame structure such that the network switching component operates as a SDH-SONET bridge.

* * * * *